(12) United States Patent
Schweitzer et al.

(10) Patent No.: US 8,919,404 B2
(45) Date of Patent: Dec. 30, 2014

(54) RUBBER COMPOSITION FOR TREAD GROOVE REINFORCEMENT

(75) Inventors: Claude Schweitzer, Colmar-Berg (LU); Carolin Anna Welter, Schleich (DE); Jean-Louis Marie Felicien Thomas, Arlon (BE); Phaniraj Muthigi, Copley, OH (US); Francois Philippe Depouhon, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 23 days.

(21) Appl. No.: 13/611,341

(22) Filed: Sep. 12, 2012

(65) Prior Publication Data

US 2014/0069560 A1 Mar. 13, 2014

(51) Int. Cl.
*B60C 1/00* (2006.01)

(52) U.S. Cl.
USPC ........ 152/564; 152/454; 152/548; 152/209.1; 523/156

(58) Field of Classification Search
None
See application file for complete search history.

(56) References Cited

U.S. PATENT DOCUMENTS

| 5,110,576 | A * | 5/1992 | Soeda et al. | 423/445 R |
| 6,213,181 | B1 | 4/2001 | Janajreh | |
| 2004/0244893 | A1 | 12/2004 | Fuhrig et al. | |
| 2004/0244894 | A1 | 12/2004 | Segatta | |
| 2006/0157177 | A1 * | 7/2006 | Shimada et al. | 152/209.5 |
| 2007/0037908 | A1 * | 2/2007 | Pille-Wolf | 524/270 |
| 2010/0154948 | A1 * | 6/2010 | Dahlberg et al. | 152/209.4 |

FOREIGN PATENT DOCUMENTS

| EP | 0967244 | 12/1999 |
| EP | 2039531 | 12/2004 |
| EP | 2009051 | 12/2008 |

* cited by examiner

*Primary Examiner* — Susannah Chung
*Assistant Examiner* — Robert T Butcher
(74) *Attorney, Agent, or Firm* — David L King

(57) ABSTRACT

The present invention relates to a rubber composition comprising at least one rubber component, between about 50 phr and about 120 phr of a filler, wherein at least 20 phr of the filler is a high surface area carbon black. Further, the composition comprises between 10 phr and 30 phr of a phenolic resin. The present invention is further directed to a tire tread or a tire comprising such a composition.

16 Claims, 4 Drawing Sheets

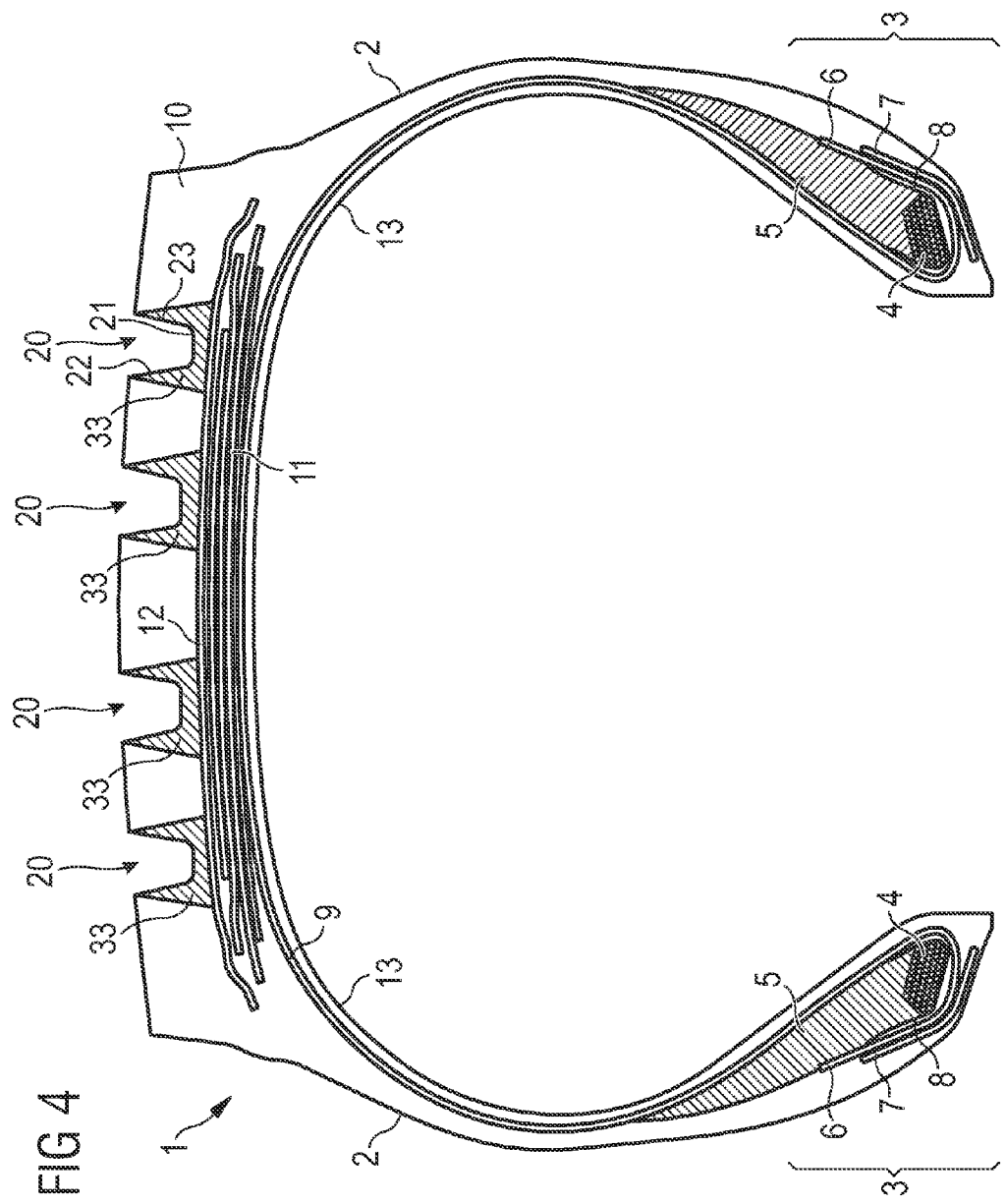

RUBBER COMPOSITION FOR TREAD GROOVE REINFORCEMENT

FIELD OF THE INVENTION

The present invention relates to a rubber composition for tread groove reinforcement. Further, the present invention relates to a tire tread and a tire comprising such a composition.

BACKGROUND OF THE INVENTION

A pneumatic tire typically includes a tread that contributes a substantial amount to the rolling resistance of the tire. Tread groove deformation may lead to subsequent heat buildup in the tread compound during operation of the tire and vice versa, thereby increasing rolling resistance. Further, groove deformation may have also a negative impact on the tire's performance. In particular, groove deformation may result in an unsatisfactory stiffness of the tire and in an unfavorable contact of the tire with the road.

U.S. Patent Application Publication 2010/0154948 A1 discloses a tire tread with groove reinforcement. In particular, the described tire has at least one circumferential groove separating circumferential ribs wherein each circumferential groove has two sides and a base there between. A reinforcing structure comprising a layer of a compound having reinforcing short fibers oriented between −20 degrees to +20 degrees to the circumferential direction of the tread is secured to the sides of each circumferential groove.

U.S. Pat. No. 6,213,181 B1 discloses a tire having a tread comprising circumferential grooves. The grooves have a groove wall lining for reducing formation of anomalies causing subjective user dissatisfaction. The lining extends over the full height of each groove and is made of a compound different from the compound of the remaining tread. In particular, the compound used for the groove lining is softer than the tread compound used in the remaining tread.

DISCLOSURE OF THE INVENTION

It is a preferred object of the invention to reduce locally the deformation of a tire's tread, in particular in areas adjacent the tread's grooves.

A further preferred object of the present invention is to locally reinforce, support or strengthen the grooves. In particular, rotation or tilt of the grooves subject to lateral forces shall be reduced or avoided.

Yet a further preferred object of the invention is to better stabilize the crown structure of the tire under lateral and longitudinal mechanical stress and improve the performance of the tire in general.

Another preferred object of the invention is an improvement of a tire's cornering stiffness.

The present invention is therefore directed to a rubber composition, in particular for groove reinforcement, comprising at least one rubber component, between about 50 phr and 120 phr of a filler, wherein at least 20 phr of the filler is a high surface area carbon black; and between 10 phr and 30 phr of a phenolic resin. The composition may comprise 100 parts of at least one rubber component, in particular natural rubber and/or polybutadiene and/or polymer and/or styrene-butadiene copolymer.

In an aspect of the invention the high surface area carbon black has an iodine adsorption number of at least 100 g/kg or of at least 200 g/kg.

In another aspect of the invention, at least 10 phr of the filler is a high surface area silica having a BET surface area of at least 150 $m^2$/g or of at least 200 $m^2$/g. However, the filler may consist essentially completely of carbon black.

In still another aspect of the invention, the rubber composition comprises at least 15 phr of the phenolic resin.

In still another aspect of the invention, the resin is a Novolac type resin.

In still another aspect of the invention, the rubber composition of each reinforcement comprises further a strip made of a plurality of cords and/or filaments. Such filaments may be oriented in either one or two directions. For example, such a strip may be essentially arranged in parallel to the circumferential direction of a groove.

Further, the present invention is also directed to a tire tread comprising the aforementioned composition.

In an aspect of the invention, the tread comprises a plurality of circumferential grooves, wherein the composition is provided as reinforcement in (laterally distinct) areas adjacent each circumferential groove such that the composition forms at least a bottom of each groove.

In a further aspect of the invention, an above mentioned strip may be arranged in one or more of the following positions: adjacent the bottom of the groove, adjacent the radially inner surface of the tread, and adjacent the radial center of the reinforcement.

In still a further aspect of the invention, the composition forms the bottom of each groove and at least the radially inner quarter but at most the radially inner two thirds of the sidewalls of each groove (whereas the remaining sidewall portions may be formed by another tread compound, e.g. a compound dedicated to get into contact with the road when driving).

In still another aspect of the invention, each area, or the composition, respectively, extends in an outer radial direction from the radially inner surface of the tread.

In still another aspect of the invention, each area extends laterally over a width which is about 1.1 to about 4.0 or about 1.5 to about 3.5 times larger than the lateral width of the adjacent groove.

In still another aspect of the invention, each area tapers from a radially inner base portion to a radially outer top portion.

In still another aspect of the invention, outside the areas, the tread (or the remaining tread) comprises or consists of rubber compound(s) having a lower hardness than the rubber composition of the reinforcement.

Further, the present invention may be directed to a tire comprising a tread or a composition according to the present invention.

In an aspect, the tire comprises one or more of the following elements: a belt having one or more belt plies, an overlay, or an undertread. Each area may extend in an outer radial direction from one of these elements.

All the above mentioned aspects and features of the disclosure of the invention may be combined with one another.

DEFINITIONS

"Apex" or "Bead Filler Apex" means an elastomeric filler located radially above the bead core and between the plies and the turnup plies.

"Axial" and "Axially" mean the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcing Belts" or "Belt" means at least two annular layers or plies of cords, woven or unwoven, underlying the tread.

"Casing" means the carcass, belt structure, beads, sidewalls and all other components of the tire excepting the tread and an undertread, i.e., the whole tire.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Equatorial Plane" means the plane perpendicular to the tire's axis of rotation and passing through the center of its tread; or the plane containing the circumferential centerline of the tread.

"Lateral" means a direction parallel to the axial direction.

"Normal Load" means the specific design inflation pressure and load assigned by the appropriate standards organization for the service condition for the tire.

"Overlay" means a ply arranged radially on the top of the belt or belt plies. Such overlays are often used for reinforcement of high-speed tires.

"Radial" and "Radially" mean directions radially toward or away from the axis of rotation of the tire.

"Sidewall" means that portion of a tire between the tread and the bead, or, in particular in the context of the present disclosure, a lateral boundary of a tread groove.

"Tread" means a molded, extruded, or shaped rubber component which, when bonded to a tire casing, includes that portion of the tire that comes into contact with the road when the tire is normally inflated and under normal load.

"Tread width" means the arc length of the tread surface in the plane including the axis of rotation of the tire.

"Undertread" means a layer of rubber placed under an extruded tread to boost adhesion of the tread to the stabilizer plies during tire assembly and preferably to cover the end of the cut belts.

BRIEF DESCRIPTION OF THE DRAWINGS

The structure, operation, and advantages of the invention will become more apparent upon contemplation of the following description taken in conjunction with the accompanying drawings, wherein:

FIG. 4 represents a schematic cross section through a tire comprising a groove reinforcement consisting of a composition according to a fourth aspect of the present invention.

DETAILED DESCRIPTION OF THE EMBODIMENTS

Figure 1:
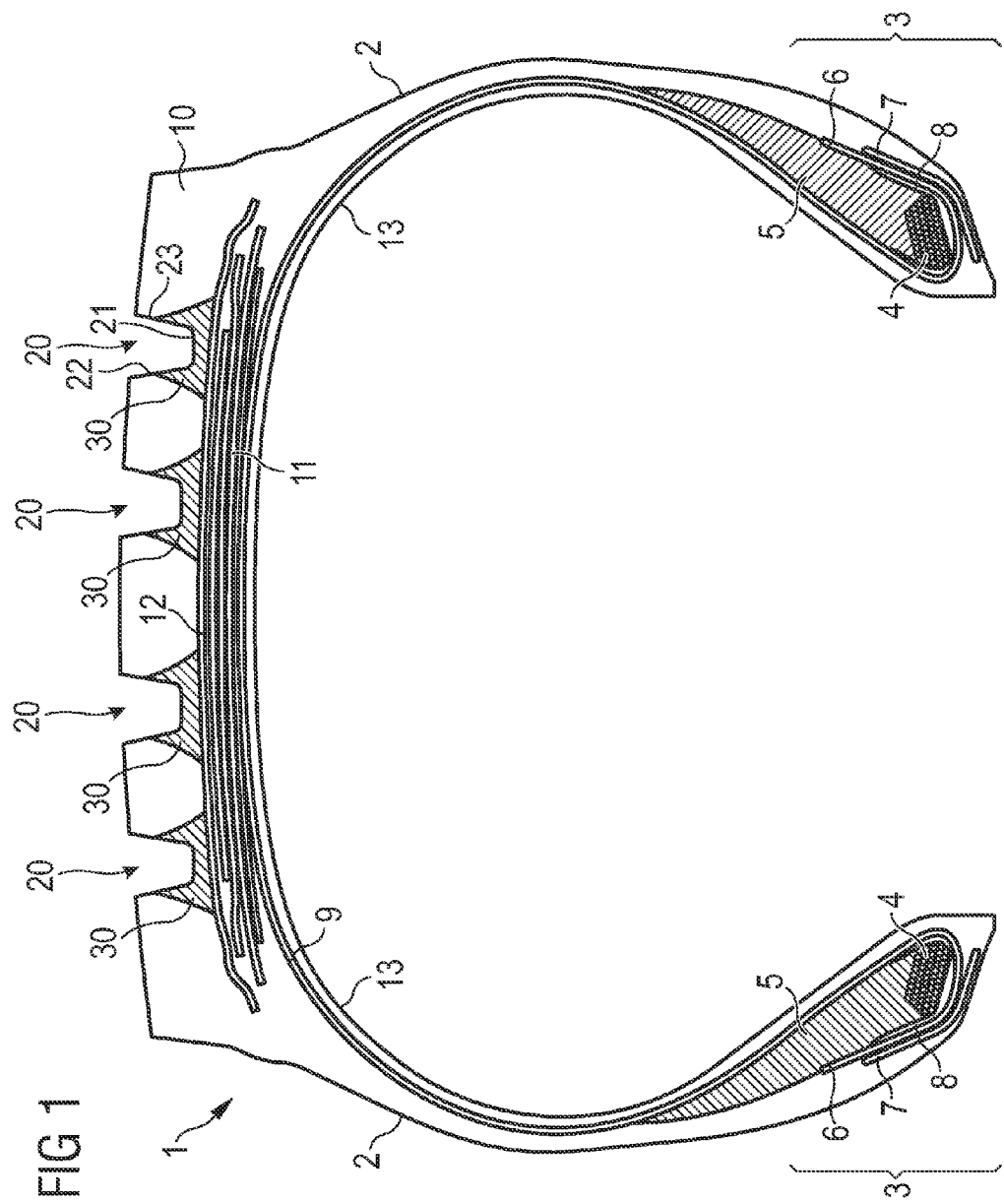
FIG. 1 represents a schematic cross section through a tire comprising a groove reinforcement consisting of a composition according to a first aspect of the present invention.

FIG. 1 shows a schematic cross section of a tire 1 according to a preferred embodiment of the invention. The tire 1 has a tread 10, an inner liner 13, a belt structure 11 comprising four belts, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. The carcass ply 9 includes a pair of axially opposite end portions 6, each of which is secured to a respective one of the beads 4. Each axial end portion 6 of the carcass ply 9 is turned up and around the respective bead 4 to a position sufficient to anchor each axial end portion 6. The carcass ply 9 may be a rubberized ply having a plurality of substantially parallel carcass reinforcing members made of a material such as polyester, rayon, or similar suitable organic polymeric compounds. The turned up portions 6 of the carcass ply 9 may engage the axial outer surfaces of two flippers 8 and axial inner surfaces of two chippers 7. As shown in FIG. 1, the example tread 10 may have four circumferential grooves 20, essentially defining a U-shaped opening in the tread 10. The main portion of the tread 10 may be formed of a tread compound, which may be any suitable tread compound or compounds. Each circumferential groove 20 is defined by a bottom 21 or base laterally separating a pair of radially extending walls 22, 23.

An area adjacent to each groove 20 comprises a groove reinforcement 30 consisting of or made of a composition according to the present invention. Non-limiting examples of such compositions are given below. As seen in FIG. 1, the groove reinforcement 30 or reinforcing area 30 forms at least a part of the groove's 20 sidewalls 22, 23 and of the base or bottom 21 of the groove 20. In particular, each depicted reinforcement 30 includes two radially extending portions forming at least partially the opposing sidewalls 22, 23 of the adjacent groove 20. Further, in the depicted example, each reinforcement 30 has a radially inner base portion which is in (direct) contact with a supporting structure arranged radially under the tread 10. Such a structure may e.g. be the overlay 12 as shown in FIG. 1. Alternatively, such a structure may, for example, be a radially outermost belt ply or an undertread. As depicted in FIG. 1, each groove 20 has its own reinforcing area 30 wherein the reinforcements 30 adjacent the different grooves 20 are distinct with respect to the lateral direction. As mentioned already above, the remaining tread 10 may be made of any suitable or common tread compound or compounds. The lateral width of a reinforcement 30 at its radially inner base portion may preferably be between 1.5 and 3.5 times larger than the axial width of the adjacent groove's bottom 21. Such a relative width may provide further stiffness and/or support for the adjacent groove 20. Preferably, the shape of the reinforcement 30 tapers in the outer radial direction. Thus, the groove reinforcements 30 have the ability to improve the stability of the bottoms 21 of the grooves 20 but do not provide large amounts of reinforcing composition in the tread blocks or ribs which might contact the road and which might have an undesired impact on rolling resistance. However, in general it is also possible that the reinforcement tapers in the opposite direction or extends with parallel sides, i.e. without taper, in the radial direction. The height of a reinforcement 30 extends preferably from a radially inner base portion (from the radially inner surface of the tread 10) to about half of the depth of the adjacent groove 20. Alternatively, the reinforcement may extend in the radial direction to at least the inner quarter of the sidewalls 22, 23 and to at most the inner two thirds of the sidewalls 22, 23 to form the sidewalls in that area. Preferably, a reinforcement 30 does not extend to the tread's (unworn) surface.

In general, it is also possible that a groove reinforcement extends on one side of a groove 20 further in the radial direction than on the other side of that groove 20. For example, a laterally outer groove 20 of a tire (e.g. having an asymmetric tread pattern) may have on its laterally outer side a higher groove reinforcement in the radial direction than at its laterally inner side. This may for instance help to avoid or counter deformations which can especially occur at such a groove 20. Preferably, the laterally outer side of a respective groove reinforcement may have a convex shape whereas the laterally inner side may have a straight shape.

Figure 2:
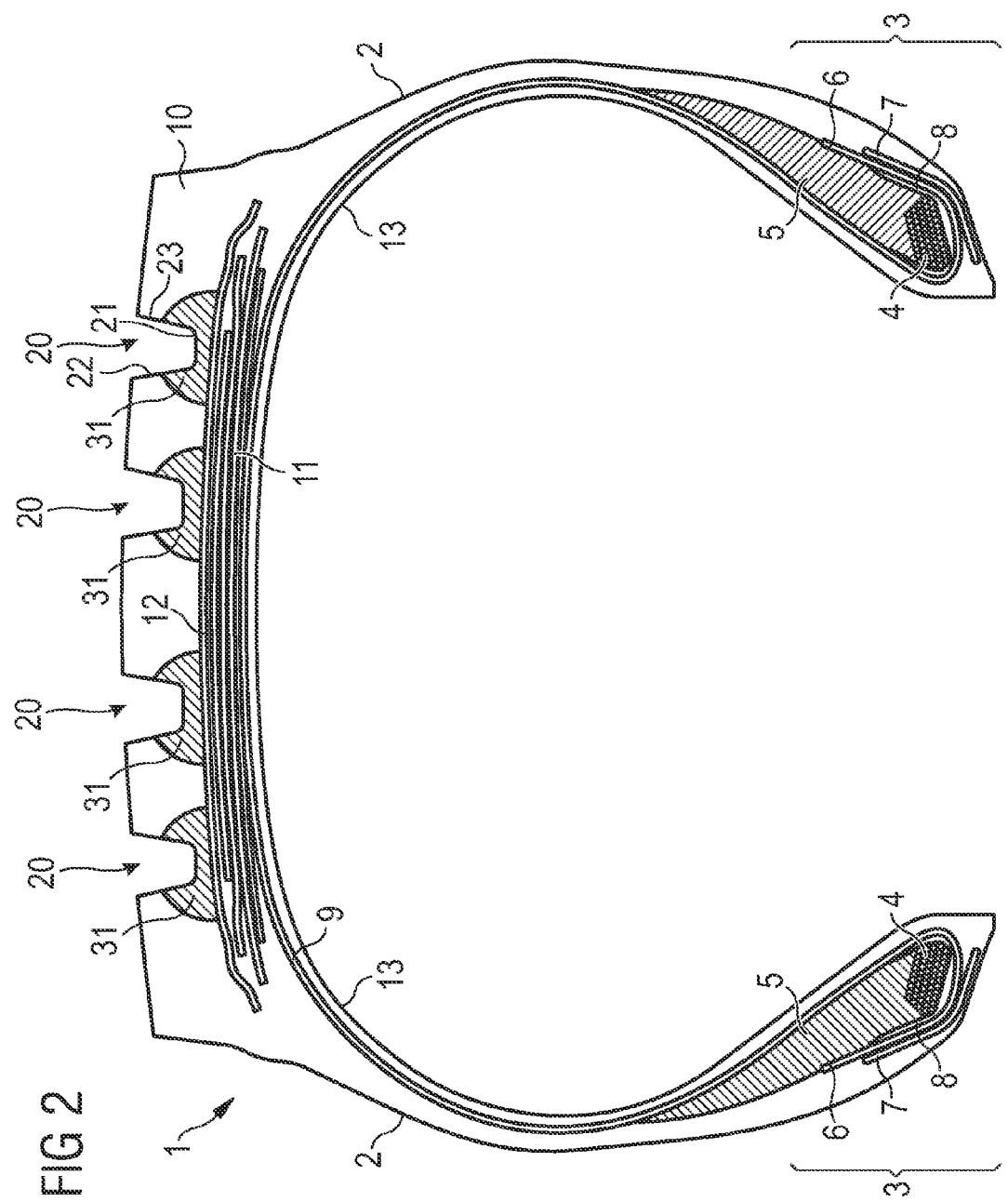
FIG. 2 represents a schematic cross section through a tire comprising a groove reinforcement consisting of a composition according to a second aspect of the present invention.

FIG. 2 shows another embodiment of a tire 1 and a tread 10 according to the present invention in which laterally distinct reinforcements 31 extend from the overlay 12 in a radial direction to the sidewalls 22, 23 of the grooves 20. The sidewalls 22, 23 made of the reinforcing composition in contact with the remaining tread or tread compound have a convex shape. This shape constitutes a preferred shape for groove reinforcement. However, it is noted that the sidewalls of the reinforcing material may also have straight shapes (as e.g. depicted in FIG. 1) or concave shapes (not shown). Concave or convex shapes may be preferred since they increase the contact surface between the reinforcement 30, 31 and the surrounding tread compound.

both sidewalls 22, 23 and also the bottom 21 of each groove 20 are formed or provided by the reinforcement 33.

The tire 1 according to the above embodiments has been shown with four circumferential grooves 20. However, the tire 10 may have more or less of such grooves 20. Further, the tire has been depicted with four belt plies and an overlay 12. An overlay 12 is merely an optional feature. Furthermore, the number of belt plies may be higher or lower. For example, the tire may have two belt plies only.

In general, it is possible to provide reinforcement described herein also to lateral grooves. However, if reinforcements 30, 31, 32, 33 are applied to circumferential grooves 20, it is possible to extrude the groove reinforcements 30, 31, 32, 33 together with the remaining tread 10 or tread compound(s). Thus, a tread 10 comprising a reinforcement 30, 31, 32 or 33 according to the present invention may be easily, cost-effectively and quickly produced.

Below TABLE 1 gives non-limiting examples of rubber compositions which, for example, may be used as material of the above described reinforcements 30, 31, 32, and 33.

TABLE 1

| EXAMPLE 1 | | EXAMPLE 2 | | EXAMPLE 3 | | EXAMPLE 4 | |
|---|---|---|---|---|---|---|---|
| phr | Material | phr | Material | phr | Material | phr | Material |
| 80 | Natural rubber | 45 | Natural rubber | 80 | Thio-functionalized high vinyl SSBR | 80 | Natural rubber |
| 20 | Polybutadiene | 55 | Polybutadiene | 20 | Polybutadiene | 20 | Polybutadiene |
| 50 | N191 grade carbon black | 60 | N134 grade carbon black | 60 | N191 grade carbon black | 70 | N191 grade carbon black |
| 20 | Silica | 0 | Silica | 20 | Silica | 20 | Silica |
| 15 | TDAE Oil | 0 | TDAE Oil | 20 | TDAE Oil | 35 | TDAE Oil |
| 2 | Bis(triethoxysilyl-propyl)disulfan | 0 | Bis(triethoxysilyl-propyl)disulfan | 2 | Bis(triethoxysilyl-propyl)disulfan | 2 | Bis(triethoxysilyl-propyl)disulfan |
| 2 | Fatty acid soap | 0 | Fatty acid soap | 2 | Fatty acid soap | 2 | Fatty acid soap |
| 3 | Stearic acid | 3 | Stearic acid | 3 | Stearic acid | 3 | Stearic acid |
| 1.5 | Wax | 1.5 | Wax | 1.5 | Wax | 1.5 | Wax |
| 3 | Hexamethylene-tetramine | 5.6 | Hexamethylene-tetramine | 3 | Hexamethylene-tetramine | 3.8 | Hexamethylene-tetramine |
| 3 | Antioxidants | 3 | Antioxidants | 3 | Antioxidants | 3 | Antioxidants |
| 20 | Novolac type resin | 10 | Novolac type resin | 20 | Novolac type resin | 25 | Novolac type resin |
| 1.6 | Sulfur | 1.6 | Sulfur | 1.6 | Sulfur | 1.3 | Sulfur |
| 2.5 | Zinc oxide | 2.5 | Zinc oxide | 2.5 | Zinc oxide | 2.5 | Zinc oxide |
| 0.3 | N-Cyclohexyl-thiophthalimide | 0 | N-Cyclohexyl-thiophthalimide | 0.3 | N-Cyclohexyl-thiophthalimide | 0.3 | N-Cyclohexyl-thiophthalimide |
| 2.4 | N,N'-dicyclo-hexyl-2-bezo-thiazolesulfenamide | 1.8 | N-cyclohexyl-2-benzothiazole-sulfenamide | 1.6 | N-cyclohexyl-2-benzothiazole-sulfenamide | 2.4 | N,N'-dicyclo-hexyl-2-bezo-thiazolesulfenamide |

Figure 3:
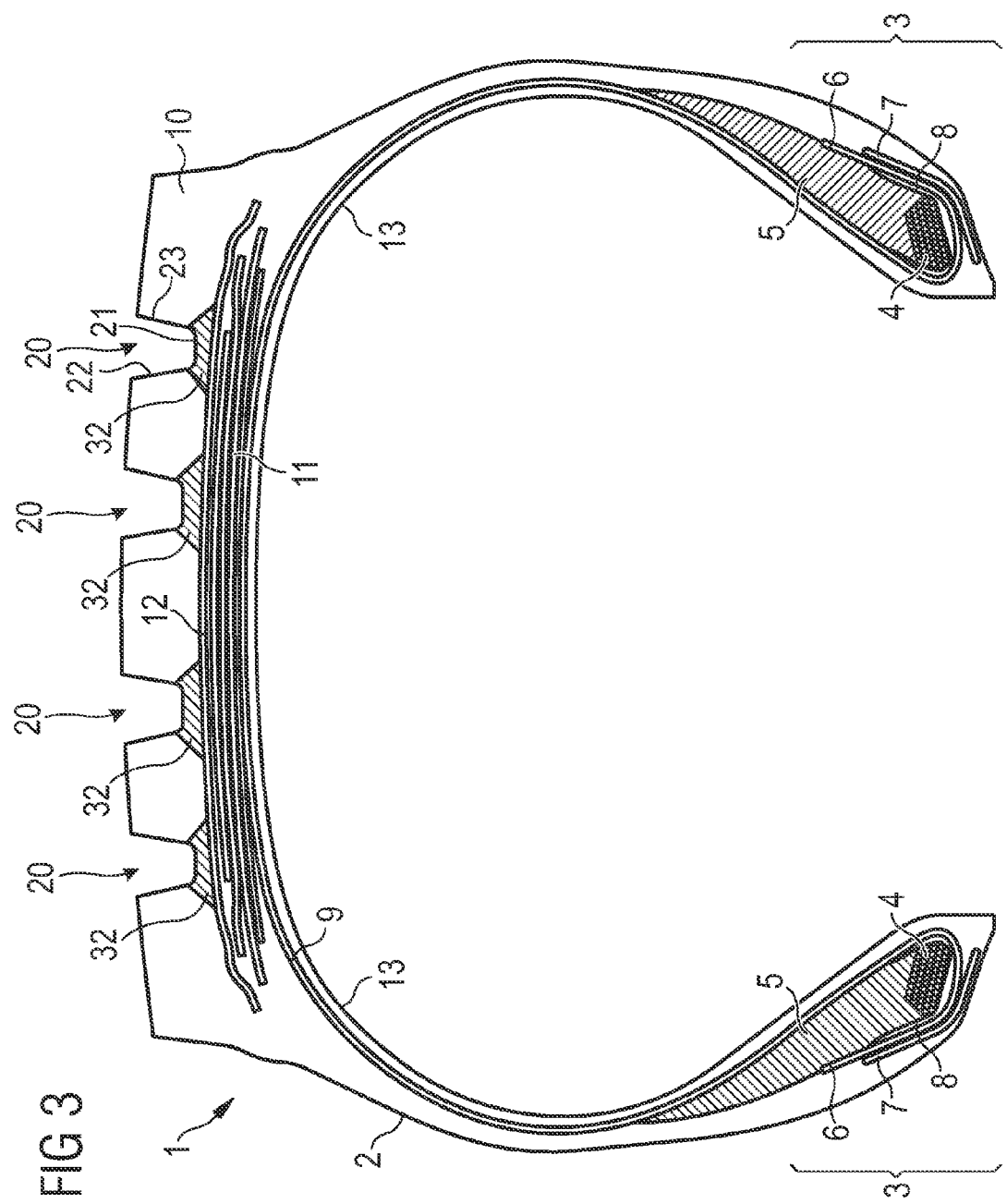
FIG. 3 represents a schematic cross section through a tire comprising a groove reinforcement consisting of a composition according to a third aspect of the present invention.

FIG. 3 depicts a further preferred embodiment of a tire 1 and a tread 10 according to the present invention. In the shown cross section, each groove reinforcement 32 has an essentially trapezoidal shape having a (narrow) top portion forming the bottom of a groove 21 and a (broad) base portion supported by or arranged on the overlay 12. According to this embodiment the grooves' sidewalls 22, 23 are made of common tread compound(s) and only the bottoms 21 of the grooves 20 are made of a reinforcing composition according to the present invention.

FIG. 4 shows yet another preferred embodiment of a tire 1 or a tread 10 according to the present invention. The depicted groove reinforcement 33 has again a tapering shape extending in the outer radial direction from a radially lower base portion to a narrower upper portion. In the present embodiment, the reinforcement 33 extends from the radially inner surface of the tread 10 to the radially outer surface of the tread 10. Thus, The compositions according to the above mentioned Examples 1 to 4 given in TABLE 1 comprise all natural rubber, polybutadiene or styrene-butadiene copolymer. However, other polymers could be used instead. Further, N191 or N134 grade carbon black is given in the above examples. However, carbon black having other grades could be used, as for example, other N1 and N2 series carbon blacks. In particular, the combination of a high surface area carbon black and a large amount of reinforcing resin results in high hardness (e.g. a Shore A hardness over 80) and high elongation at break (e.g. more than 300%). Although a high Shore A hardness may be known for some other rubber compositions, for example like those for apexes, it is not known in the state of the art to produce the above mentioned combination. In particular, it is preferable that the carbon black has a high surface area with an iodine adsorption number of at least about 100 g/kg or preferably at least 180 g/kg. As known in the art, the iodine adsorption number is a standard measure of the surface area of carbon black which is high in the present case.

According to Examples 1 to 4, silica has been used in the composition between 0 phr and 20 phr. Preferably, the silica has a BET surface area of at least 100 m²/g, or more preferably, of at least 180 m²/g. The definition of the BET surface area is also well-known to the person skilled in the art.

Further, some of the listed tire compositions comprise parts of TDAE Oil. The amount of that component may also vary. Moreover, it may be replaced by alternative substances, as for example by MES, RAE, naphthenic oil, vegetable oil or other plasticizers.

According to the above examples a Novolac type resin is used. However, other non-self curing phenolic resins could be used as well. According to the above examples the resin is cross-linked using hexamethylene tetramine or hexamethoxymethylmelamine. However, other cross-linking agents could be used as well.

The further components listed with amounts of less than 5 phr constitute components which are common in multiple rubber compositions and may vary as known to a person skilled in the art. For example, other silanes could be used instead of the mentioned Bis(triethoxysilylpropyl)disulfan, e.g. bis(3-triethoxysilylpropyl)tetradulfide, Evonik Si363 from "Evonik", NXT, NXT Z100, NXT Z60, NXT Z45 from "Momentive Performance Materials". Instead of N-Cyclohexylthiophthalimide other prevulcanization inhibitors may be used. Further, N,N'-dicyclohexyl-2-bezothiazolesulfenamide could e.g. be replaced by other known accelerators.

Tests of the inventors have shown that the above compositions have a Shore A hardness >80. In other words, the reinforcing composition is considerably harder than common tread compounds. Further, the inventors have tested the elongation at break which is indeed larger than 300%.

A composition having a high Shore A hardness, as e.g. suggested in Examples 1 to 4, may on the one hand provide stability and a high cornering stiffness to the tire 1, if provided adjacent the grooves 20 as described herein above. On the other hand, a high elongation at break provides durability and crack resistance to the tread 10 in the region of the grooves 20.

As mentioned above, tire components having a high Shore A hardness, as e.g. apexes may be known. However, such components have a considerably lower elongation at break (e.g. less than 150%). In particular, they do not comprise high surface area fillers.

The following TABLE 2 shows experimental results of the inventors directed to measurements of example tires' cornering stiffness at one degree slip angle and different loads and inflation pressures.

TABLE 2

| | | Cornering stiffness coefficient [1/°] | | |
|---|---|---|---|---|
| load [N] | pressure [bar] | without groove reinforcement | with groove reinforcement | difference (%) |
| 1448 | 2.3 | 0.553 | 0.575 | 4 |
| 2172 | 2.3 | 0.534 | 0.565 | 6 |
| 3138 | 2.3 | 0.472 | 0.513 | 9 |
| 4827 | 2.3 | 0.353 | 0.391 | 11 |
| 6420 | 2.3 | 0.246 | 0.276 | 12 |
| 8013 | 2.3 | 0.173 | 0.193 | 12 |
| 1448 | 2.7 | 0.517 | 0.537 | 4 |
| 2172 | 2.7 | 0.501 | 0.531 | 6 |
| 3138 | 2.7 | 0.470 | 0.501 | 7 |
| 4827 | 2.7 | 0.378 | 0.414 | 10 |
| 6420 | 2.7 | 0.288 | 0.319 | 11 |
| 8013 | 2.7 | 0.209 | 0.235 | 12 |
| 1448 | 3.2 | 0.485 | 0.500 | 3 |
| 2172 | 3.2 | 0.472 | 0.492 | 4 |
| 3138 | 3.2 | 0.448 | 0.476 | 6 |
| 4827 | 3.2 | 0.386 | 0.418 | 8 |
| 6420 | 3.2 | 0.319 | 0.349 | 9 |
| 8013 | 3.2 | 0.254 | 0.276 | 9 |

Thus, cornering stiffness may be considerably improved by means of the compound according to the invention if applied in areas adjacent the grooves 20 of a tread 10.

Further, in view of the relatively large amount of carbon black in the reinforcement, the composition has an electrical conductivity which may render conductive chimneys obsolete.

Applicant emphasizes that the present invention may be used for any type of tire, e.g. for passenger car tires, especially for sports car tires, truck tires or aircraft tires. The tires may be pneumatic or non-pneumatic.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims.

In any case the above described embodiments and examples shall not be understood in a limiting sense. In particular, the features of the above embodiments may also be replaced or combined with one another.

The invention claimed is:

1. A rubber composition for groove reinforcement in a tread for a tire comprising:
    at least one rubber component;
    between about 50 phr and 120 phr of a filler, wherein at least 20 phr of the filler is a high surface area carbon black wherein the high surface area carbon black has an iodine adsorption number of at least 100 g/kg; and
    between 10 phr and 30 phr of a phenolic resin; and
    wherein the tread has a tread rubber composition for road contact and the rubber composition for groove reinforcement is a different composition located adjacent a groove, covering at least a groove bottom, but not extending to the unworn surface of the tread, the rubber composition for the groove reinforcement having a shore A hardness >80 and an elongation at break more than 300 percent, and wherein the groove reinforcement has two radially extending portions forming at least partially opposing sidewalls, the adjacent groove and a radially inner base which is in direct contact with a supporting structure arranged under the tread forming distinct reinforcement areas with respect to the lateral direction.

2. The rubber composition for groove reinforcement in a tread for a tire according to claim 1, wherein the high surface area carbon black has an iodine adsorption number of at least 200 g/kg.

3. The rubber composition for groove reinforcement in a tread for a tire according to claim 1, wherein at least 10 phr of the filler is a high surface area silica having a BET surface area of at least 100 m²/g.

4. The rubber composition for groove reinforcement in a tread for a tire according to claim 3, wherein the high surface area silica has a BET surface area of at least 200 m²/g.

5. The rubber composition for groove reinforcement in a tread for a tire according to claim 1, wherein the rubber composition comprises at least 15 phr of the phenolic resin.

6. A tire tread comprising the rubber composition for groove reinforcement in a tread for a tire according to claim 1.

7. The tread according to claim 6, comprising a plurality of circumferential grooves, wherein the rubber composition for groove reinforcement is provided as reinforcement areas adjacent each circumferential groove such that the rubber composition forms at least a bottom of each groove.

8. The tread according to claim 7, wherein the rubber composition is formed into a strip, the strip made of the rubber composition for groove reinforcement to which a plurality of filaments or cords are added, the strip being essentially arranged in parallel to the circumferential direction of the groove.

9. The tread according to claim 8, wherein said strip is arranged in one or more of the following positions: adjacent the bottom of the groove, adjacent the radially inner surface of the tread, and adjacent the radial center of each of the reinforcement areas.

10. The tread according to claim 7, wherein the rubber composition for groove reinforcement forms the bottom of each groove and at least the radially inner quarter but at most the radially inner two-thirds of the sidewalls of each groove.

11. The tread according to claim 7, wherein in each reinforcement area the rubber composition for groove reinforcement extends in a radial direction from the radially inner surface of the tread.

12. The tread according to claim 7, wherein each reinforcement area extends laterally over a width which is about 1.1 to 4.0 times larger than the lateral width of the adjacent groove.

13. The tread according to claim 7, wherein each reinforcement area tapers from a radially inner base portion to a radially outer top portion.

14. The tread according to claim 7, wherein outside the reinforcement areas, the tread consists of rubber compound or compounds having a lower hardness than the rubber composition for groove reinforcement of the reinforcement areas.

15. A tire comprising a tread according to claim 7.

16. The tire according to claim 15 comprising one or more of the following elements: a belt having one or more belt plies, an overlay, or an undertread;

wherein each reinforcement area extends in an outer radial direction from one of a radially outermost belt ply or the overlay or the undertread.

* * * * *